US012603395B2

(12) United States Patent
Jeung et al.

(10) Patent No.: US 12,603,395 B2
(45) Date of Patent: Apr. 14, 2026

(54) BATTERY MODULE ASSEMBLY APPARATUS USING VISION UNIT WITH ILLUMINATION PORTION

(71) Applicant: LG ENERGY SOLUTION, LTD., Seoul (KR)

(72) Inventors: Seok Won Jeung, Daejeon (KR); Hyun Min Oh, Daejeon (KR); Geon Tae Park, Daejeon (KR); Soo Jun Ahn, Daejeon (KR); Choon Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 780 days.

(21) Appl. No.: 17/797,330

(22) PCT Filed: Apr. 26, 2021

(86) PCT No.: PCT/KR2021/005213
§ 371 (c)(1),
(2) Date: Aug. 3, 2022

(87) PCT Pub. No.: WO2021/235715
PCT Pub. Date: Nov. 25, 2021

(65) Prior Publication Data
US 2023/0059357 A1 Feb. 23, 2023

(30) Foreign Application Priority Data
May 21, 2020 (KR) ........................ 10-2020-0061105

(51) Int. Cl.
*H01M 50/516* (2021.01)
*H01M 50/213* (2021.01)

(52) U.S. Cl.
CPC ....... *H01M 50/516* (2021.01); *H01M 50/213* (2021.01)

(58) Field of Classification Search
CPC .. B23K 1/0016; B23K 3/0623; B23K 3/0638; B23K 3/087; B23K 37/047; H01M 50/213; H01M 50/244; H01M 50/516
See application file for complete search history.

(56) References Cited

U.S. PATENT DOCUMENTS

| 2015/0072217 A1 | 3/2015 | Kim et al. |
| 2015/0079449 A1 | 3/2015 | Kim et al. |

(Continued)

FOREIGN PATENT DOCUMENTS

| CN | 104733669 A | 6/2015 |
| CN | 205406643 U | 7/2016 |

(Continued)

OTHER PUBLICATIONS

International Search Report (PCT/ISA/210) issued in PCT/KR2021/005213 mailed on Jul. 28, 2021.

(Continued)

*Primary Examiner* — Minh N Trinh
(74) *Attorney, Agent, or Firm* — Birch, Stewart, Kolasch & Birch, LLP

(57) ABSTRACT

Discussed is a battery module assembly apparatus using vision, the battery module assembly apparatus including: a transfer unit configured to move in at least one of forwards, rearwards, leftwards and rightwards when a battery module having a battery cell received therein is seated on the transfer unit; a vision unit configured to check a position of the battery module; and a bonding unit configured to electrically connect an electrode of the battery cell and a busbar to each other.

11 Claims, 8 Drawing Sheets

(56) References Cited

U.S. PATENT DOCUMENTS

| | | | |
|---|---|---|---|
| 2015/0111083 A1 | 4/2015 | Kim et al. | |
| 2015/0179995 A1 | 6/2015 | Nakamura et al. | |
| 2015/0221911 A1 | 8/2015 | Kim et al. | |
| 2015/0221922 A1 | 8/2015 | Kim et al. | |
| 2018/0017487 A1* | 1/2018 | Backman | A61B 5/0066 |
| 2018/0190960 A1 | 7/2018 | Harris et al. | |
| 2020/0212494 A1 | 7/2020 | Kim et al. | |
| 2020/0343518 A1 | 10/2020 | Harris et al. | |
| 2023/0059357 A1* | 2/2023 | Jeung | B23K 3/0623 |

FOREIGN PATENT DOCUMENTS

| | | |
|---|---|---|
| CN | 107946508 A | 4/2018 |
| CN | 108539243 A | 9/2018 |
| CN | 106825959 B | 12/2018 |
| CN | 208423080 U | 1/2019 |
| CN | 110340519 A | 10/2019 |
| JP | 2001-343905 A | 12/2001 |
| JP | 2011-33663 A | 2/2011 |
| JP | 2013-26383 A | 2/2013 |
| JP | 5637005 B2 | 12/2014 |
| JP | 2015-122145 A | 7/2015 |
| JP | 2016-15310 A | 1/2016 |
| JP | 2017-10644 A | 1/2017 |
| JP | 2017-126522 A | 7/2017 |
| JP | 2019-179653 A | 10/2019 |
| KR | 10-1289430 B1 | 7/2013 |
| KR | 10-1446147 B1 | 10/2014 |
| KR | 10-1525798 B1 | 6/2015 |
| KR | 10-1697698 B1 | 1/2017 |
| KR | 10-2017-0071077 A | 6/2017 |
| KR | 10-1810659 B1 | 12/2017 |
| KR | 10-1900403 B1 | 9/2018 |
| KR | 10-1908628 B1 | 10/2018 |
| KR | 10-2016-0128891 A | 11/2018 |
| KR | 10-2019-0092588 A | 8/2019 |
| KR | 10-2019-0113022 A | 10/2019 |
| KR | 102242248 B1 * | 4/2021 ......... H01M 50/536 |

OTHER PUBLICATIONS

Extended European Search Report for European Application No. 21807735.2, dated Jul. 25, 2024.

* cited by examiner

【FIG. 1】        -- Conventional Art --
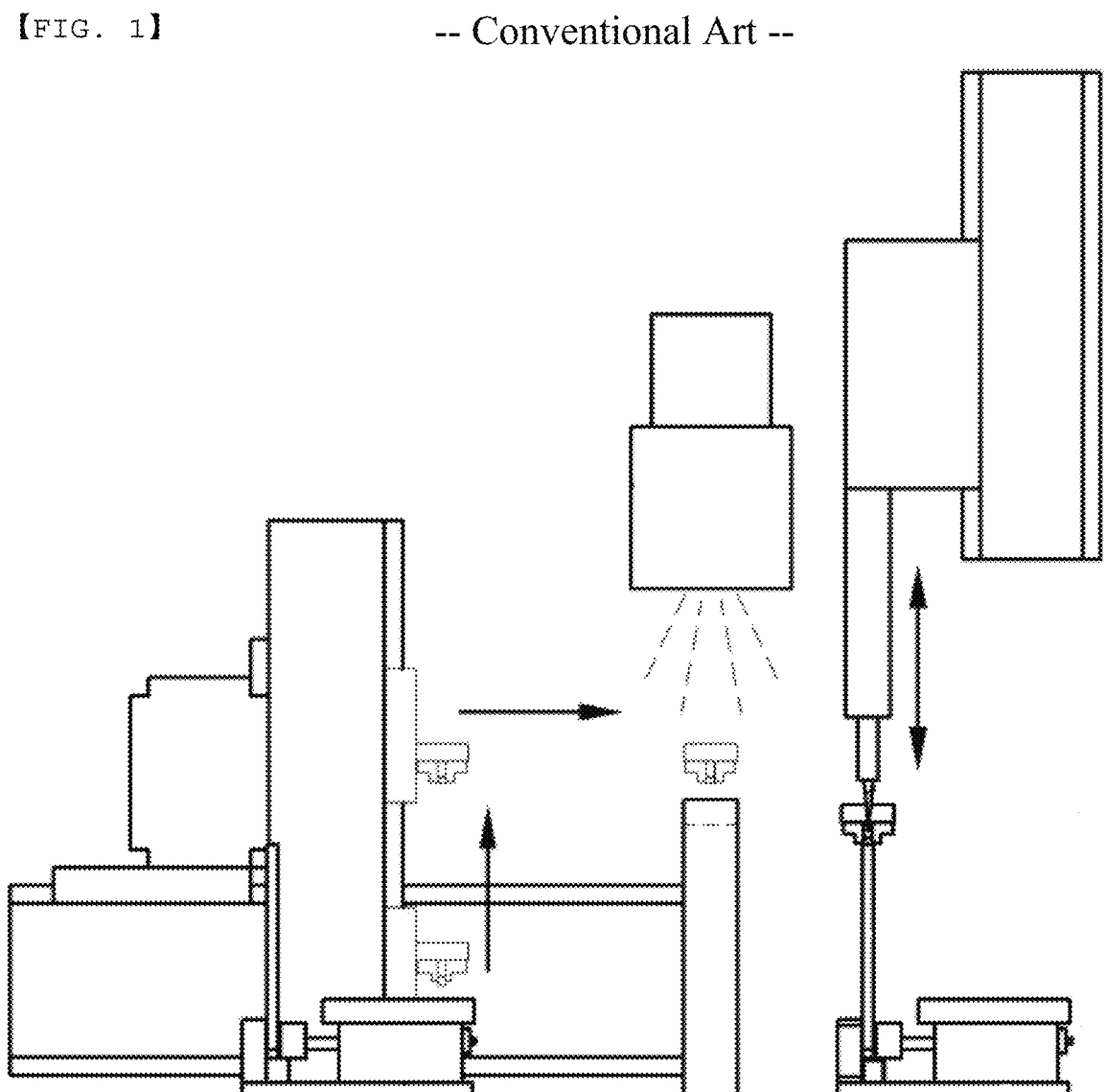

【FIG. 2】
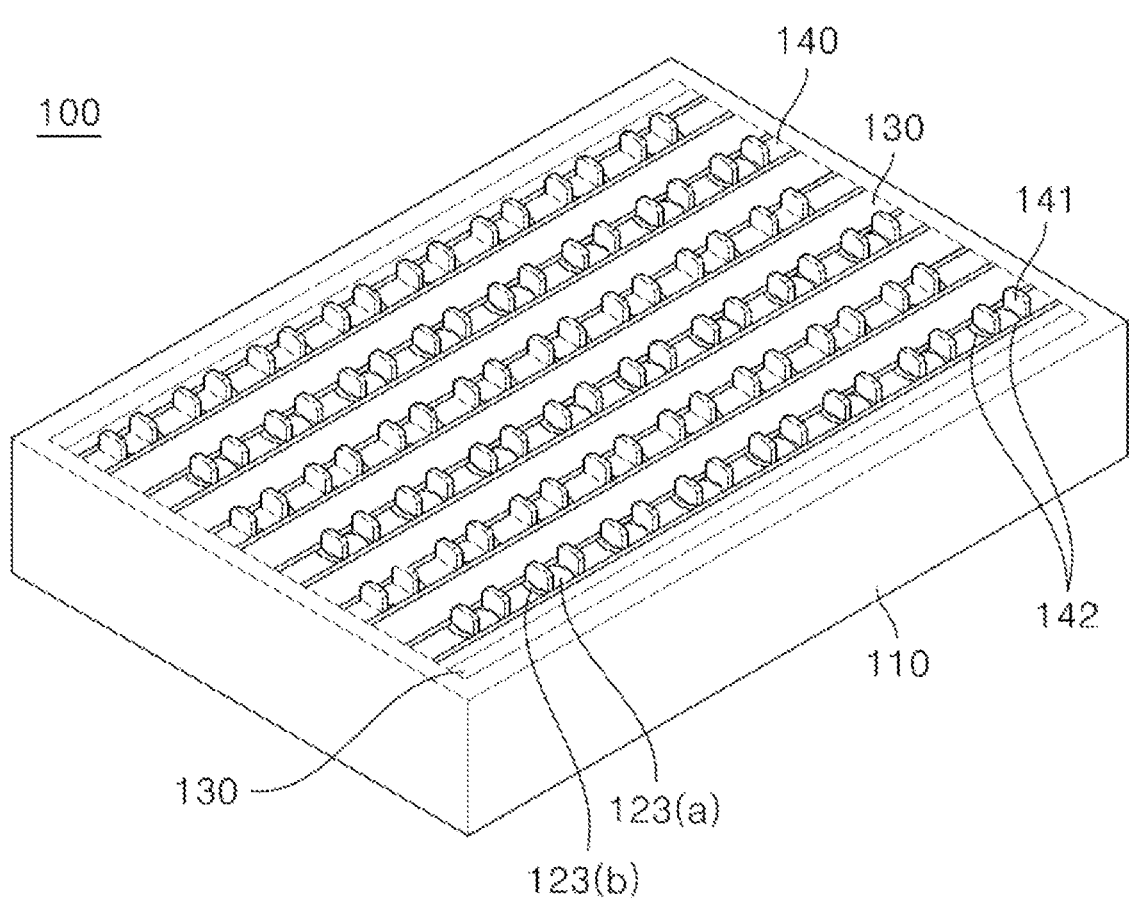

【FIG. 3】
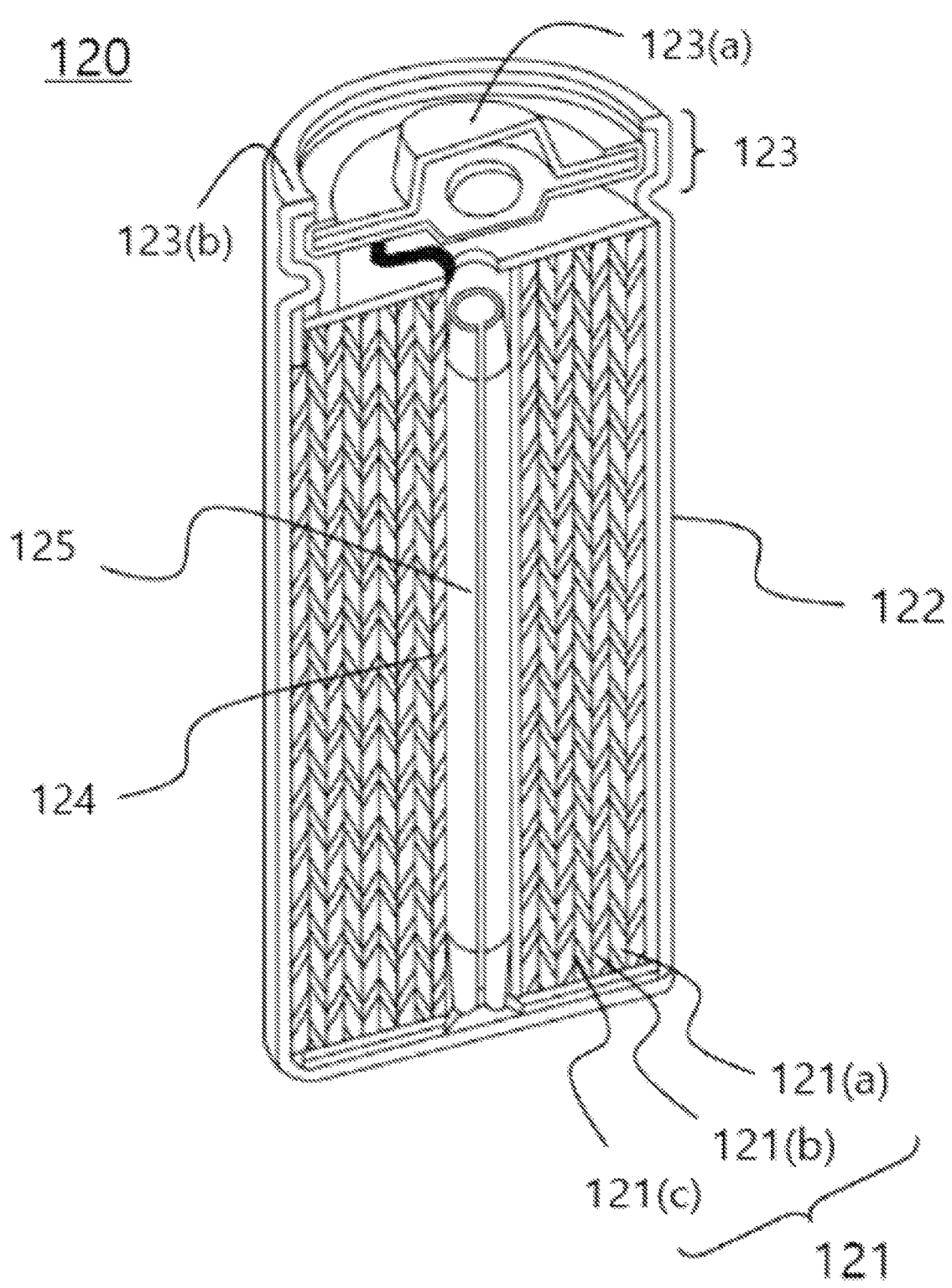

【FIG. 4】
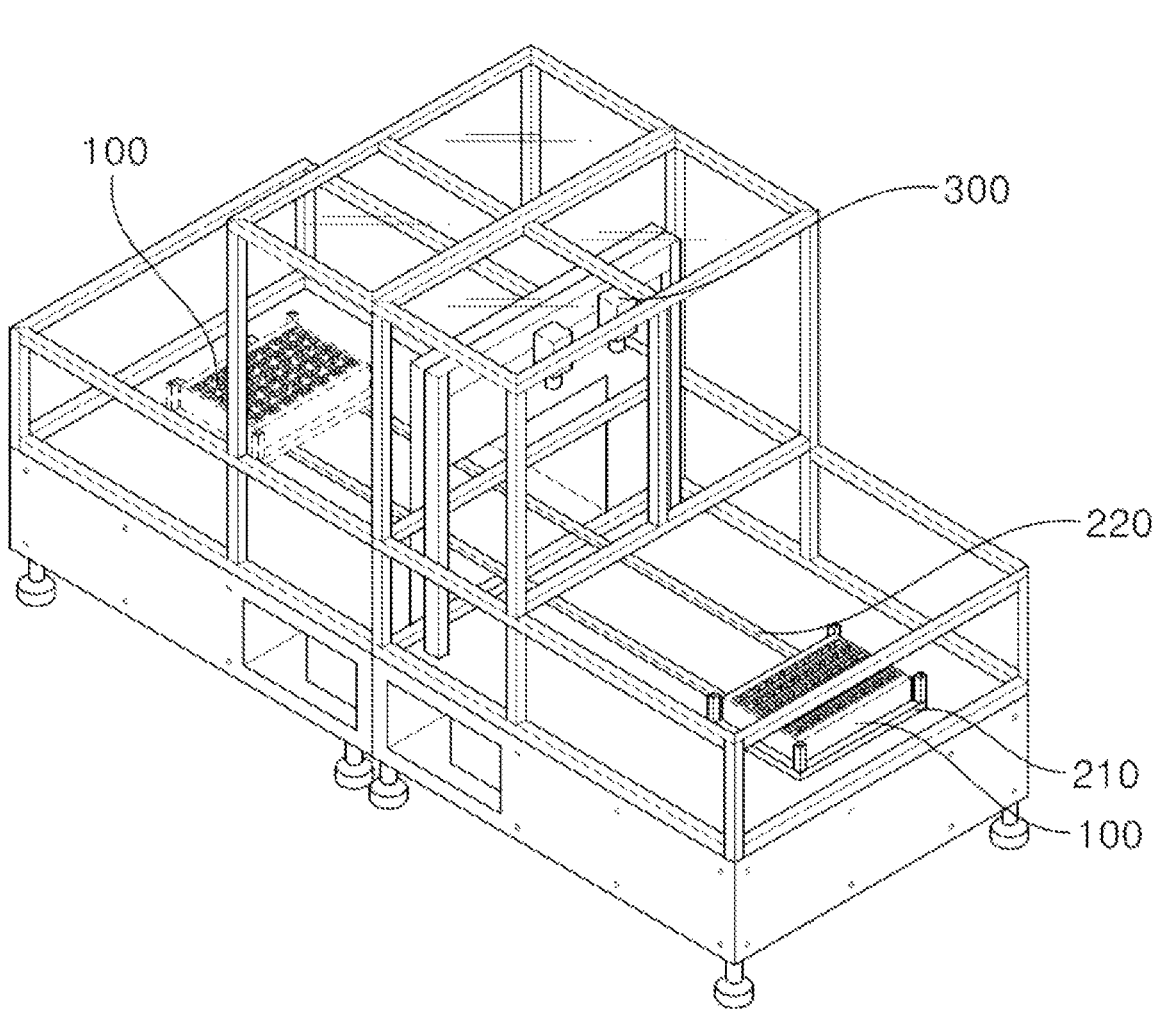

【FIG. 5】
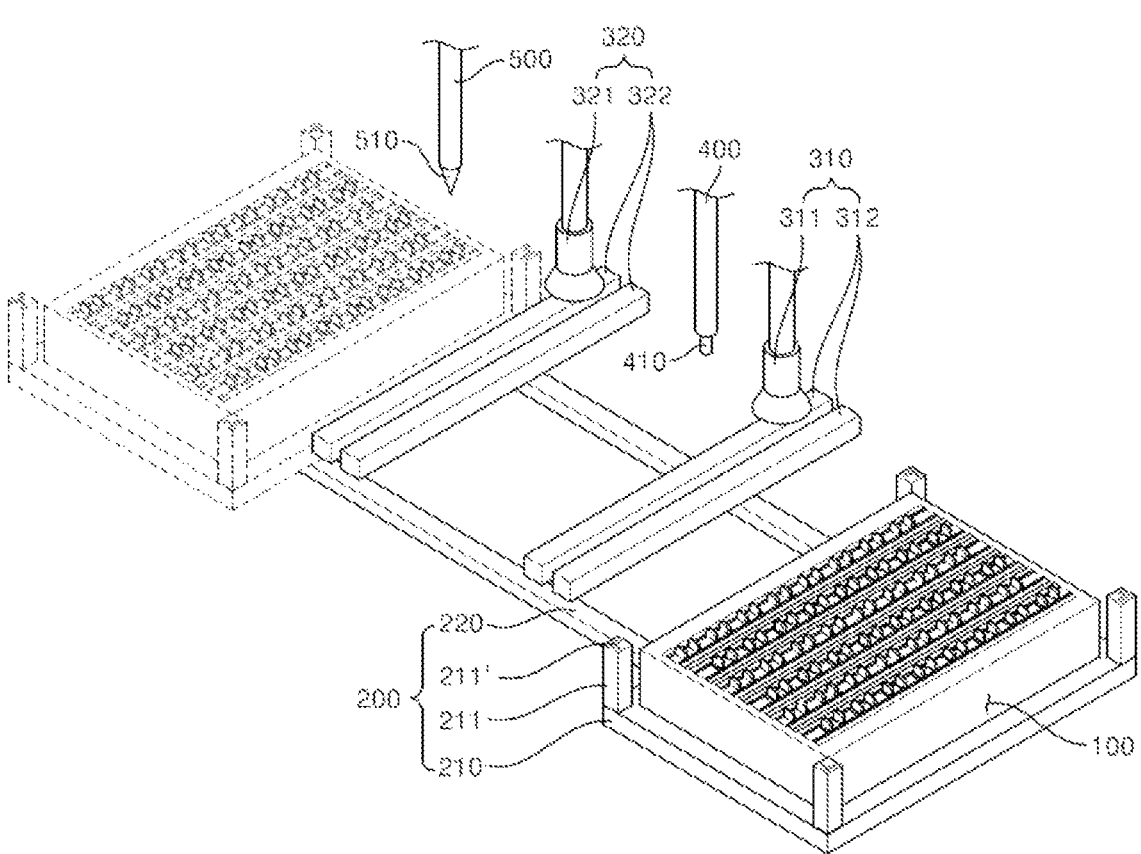

【FIG. 6】
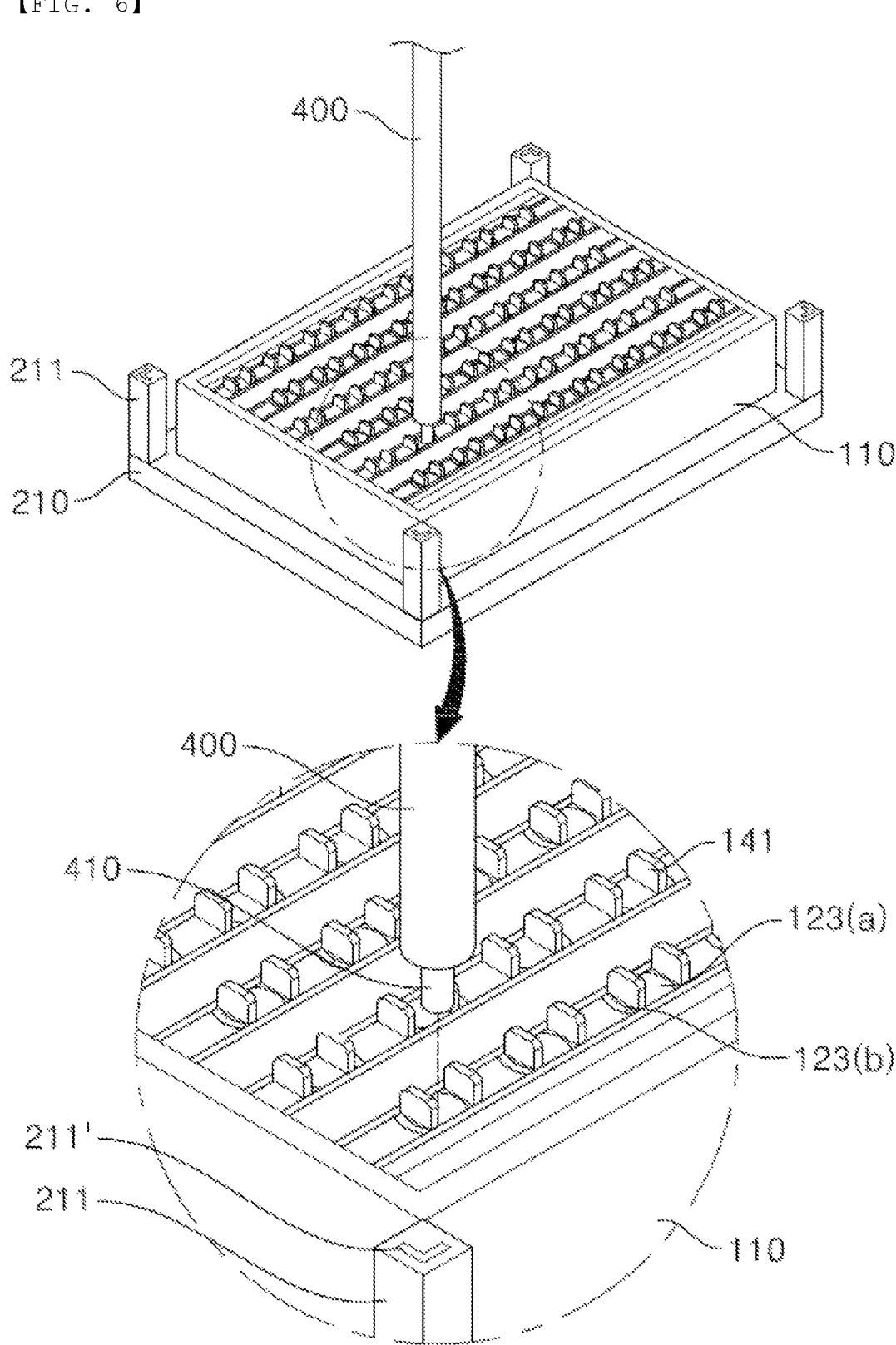

【FIG. 7】
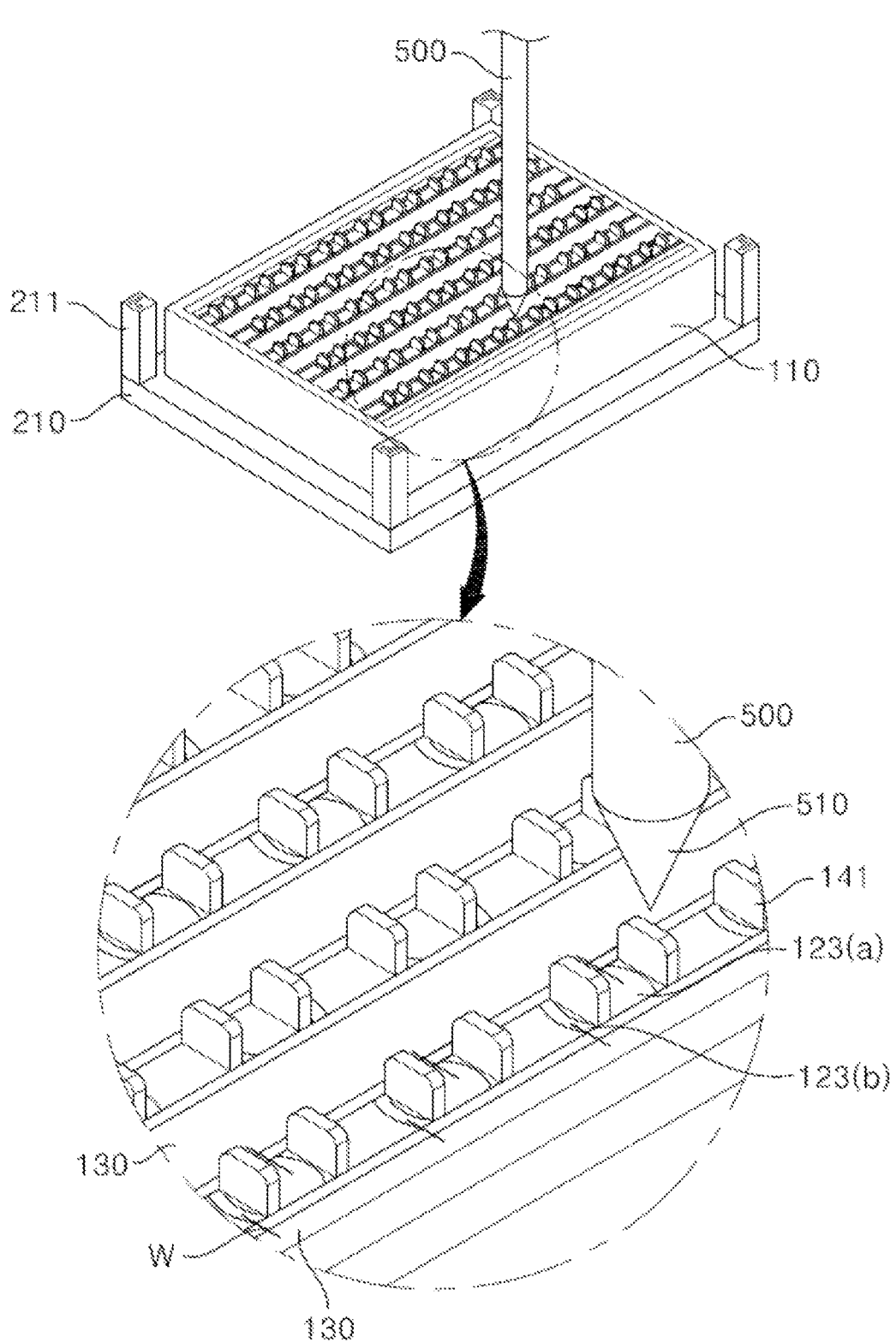

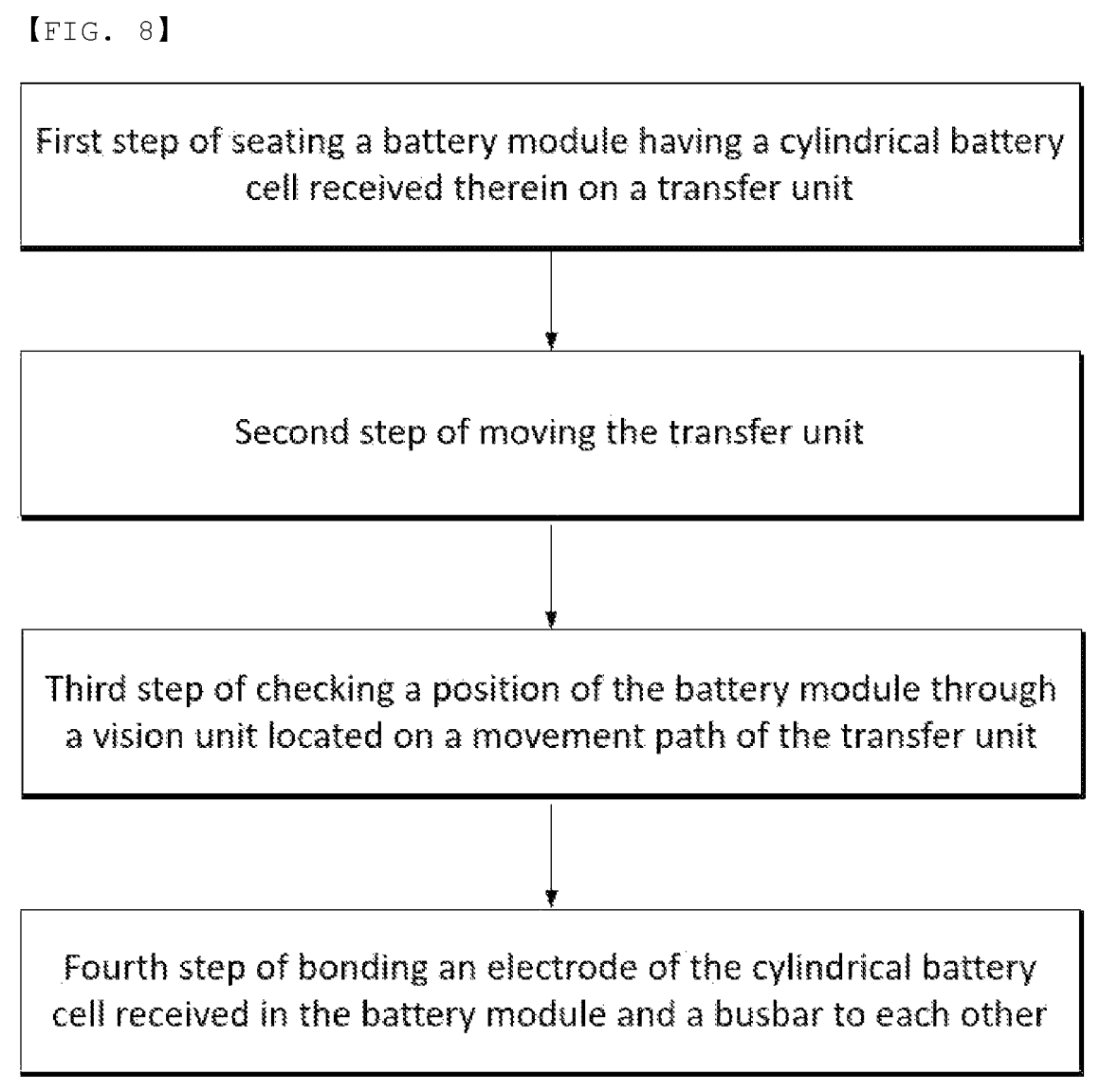

【FIG. 8】

First step of seating a battery module having a cylindrical battery
cell received therein on a transfer unit

↓

Second step of moving the transfer unit

↓

Third step of checking a position of the battery module through
a vision unit located on a movement path of the transfer unit

↓

Fourth step of bonding an electrode of the cylindrical battery
cell received in the battery module and a busbar to each other

BATTERY MODULE ASSEMBLY APPARATUS USING VISION UNIT WITH ILLUMINATION PORTION

TECHNICAL FIELD

This application claims the benefit of priority to Korean Patent Application No. 2020-0061105 filed on May 21, 2020, the disclosure of which is incorporated herein by reference in its entirety.

The present invention relates to a battery module assembly apparatus using vision and an assembly method using the same, and more particularly to a battery module assembly apparatus using vision capable of accurately recognizing the position at which a battery cell and a busbar will be electrically connected to each other and minimizing poor contact therebetween due to foreign matter at the time of electrical connection therebetween and an assembly method using the same.

BACKGROUND ART

A secondary battery, which has high ease of application based on product family and electrical characteristics, such as high energy density, has been universally applied to an electric vehicle (EV) or a hybrid electric vehicle (HEV) driven by an electrical driving source as well as portable devices. Such a secondary battery has attracted attention as a new energy source capable of enhancing environmental friendliness and energy efficiency in that the secondary battery has a primary advantage of remarkably reducing the use of fossil fuels and in that no by-products due to the use of energy are generated.

There are a lithium ion battery, a lithium polymer battery, a nickel-cadmium battery, a nickel-hydride battery, and a nickel-zinc battery as secondary batteries that are widely used at present. The operating voltage of such a unit secondary battery cell, i.e. a unit battery cell, is about 2.5V to 4.5V. In the case in which output voltage higher than the above operating voltage is required, therefore, a plurality of battery cells may be connected to each other in series to constitute a battery module.

Of course, a plurality of battery modules may be connected to each other in parallel or in series depending on required charge and discharge capacities to constitute a battery pack.

Meanwhile, in order to satisfy required output voltage, a plurality of cylindrical battery cells is received in a battery module, and the battery cells are connected to each other via a busbar in order to increase energy density. For the cylindrical battery cell, however, a positive electrode and a negative electrode are located very close to each other, and the areas of portions having corresponding polarities are small, whereby connection between the cylindrical battery cell and the busbar is not easily achieved.

In connection therewith, FIG. 1 is a view showing an apparatus for bonding a conventional battery cell. Referring to FIG. 1, a battery module assembly apparatus includes a supply unit configured to supply a battery module to the apparatus, a transfer unit configured to transfer the supplied battery module to a work position, a vision type camera configured to scan the transferred battery module, and a welding unit configured to bond the battery module. The battery module transferred by the transfer unit is scanned through the vision type camera to set coordinates, and is moved to the position of the welding unit based on the information such that bonding is performed by the welding unit.

In the conventional art, a bonding position is set using the vision type camera, and then bonding is performed. Since there is no light source configured to illuminate the battery module, however, it is difficult to accurately recognize the position of the battery module. In particular, there is a possibility of the battery module being contaminated by various kinds of foreign matter, such as dust, until the battery module reaches the welding unit, whereby welding defects may occur.

Prior Art Document (Patent Document 1) Korean Registered Patent Publication No. 1810659

DISCLOSURE

Technical Problem

The present invention has been made in view of the above problems, and it is an object of the present invention to provide a battery module assembly apparatus using vision capable of accurately scanning the positions of a module case and a battery cell received in the module case such that the battery cell can be bonded to a busbar at a predetermined position and an assembly method using the same.

It is another object of the present invention to provide a battery module assembly apparatus using vision capable of removing foreign matter attached to the region of the battery cell to be bonded, thereby minimizing bonding defects, and an assembly method using the same.

Technical Solution

In order to accomplish the above objects, a battery module assembly apparatus according to the present invention includes a transfer unit configured to move in at least one of forwards, rearwards, leftwards and rightwards when a battery module having a battery cell received therein is seated on the transfer unit; a vision unit configured to check the position of the battery module; and a bonding unit configured to electrically connect an electrode of the battery cell and a busbar to each other.

Also, in the assembly apparatus according to the present invention, the battery module may further have a cover case configured to cover the upper part of the received battery cell.

Also, in the assembly apparatus according to the present invention, the cover case may be provided with a protrusion formed so as to protrude upwards by a predetermined height, and an opening configured to allow a portion of the upper surface of the battery cell to be exposed therethrough.

Also, in the assembly apparatus according to the present invention, the transfer unit may include a seating die configured to allow the bottom surface of the battery module to be disposed in contact therewith and a plurality of guide portions located at corners of the seating die, each of the plurality of guide portions having a predetermined height.

Also, in the assembly apparatus according to the present invention, an "L"-shaped marker may be formed at the upper surface of each of the plurality of guide portions.

Also, in the assembly apparatus according to the present invention, the vision unit may include an illumination portion and a vision camera configured to scan the battery module.

Also, the assembly apparatus according to the present invention may further include a washing unit configured to remove foreign matter from the battery cell.

Also, in the assembly apparatus according to the present invention, the washing unit may be a laser device.

Also, in the assembly apparatus according to the present invention, the vision unit may include a first vision unit and a second vision unit, and the first vision unit, the washing unit, and the second vision unit may be sequentially located in the named order.

Also, in the assembly apparatus according to the present invention, the vision unit may include a first vision unit and a second vision unit, and the first vision unit, the second vision unit, and the washing unit may be sequentially located in the named order.

In addition, an assembly method according to the present invention includes seating a battery module having a battery cell received therein on a transfer unit; moving the transfer unit; checking the position of the battery module through a vision unit located on a movement path of the transfer unit; and bonding an electrode of the battery cell received in the battery module and a busbar to each other.

Also, the assembly method according to the present invention may further include washing a portion to be bonded on the upper surface of the battery cell before bonding of the electrode and the bus bar.

Also, in the assembly method according to the present invention, the position of the battery module may be checked twice through the vision unit in the checking of the position of the battery module, and the washing of the portion to be bonded may be performed between the two position checking operation.

Also, in the assembly method according to the present invention, the position of the battery module may be checked twice through the vision unit in the checking of the position of the battery module, and the washing of the portion to be bonded may be performed after the two position checking operation.

In addition, a battery pack according to the present invention includes a battery module obtained using the assembly method.

Advantageous Effects

A battery module assembly apparatus using vision according to the present invention and an assembly method using the same have a merit in that a plurality of vision units scans a battery module, and a cylindrical battery cell and a busbar are bonded to each other based on the result, whereby it is possible to perform bonding at a correct position.

In addition, the battery module assembly apparatus using vision according to the present invention and the assembly method using the same have an advantage in that a washing unit configured to wash only a portion to be bonded is provided, whereby it is possible to minimize bonding defects due to foreign matter.

Furthermore, the battery module assembly apparatus using vision according to the present invention and the assembly method using the same have a merit in that an illumination portion having high illuminance is provided, whereby it is possible to improve reliability in result of scanning by a vision camera.

DESCRIPTION OF DRAWINGS

FIG. 1 is a view showing an apparatus for bonding a conventional battery cell.

FIG. 2 is a perspective view showing a battery module according to a preferred embodiment of the present invention.

FIG. 3 is a sectional view of a cylindrical battery cell according to a preferred embodiment of the present invention.

FIG. 4 is an overall perspective view of a battery module assembly apparatus having vision according to a preferred embodiment of the present invention.

FIG. 5 is an enlarged perspective view showing the interior of the battery module assembly apparatus having vision according to the preferred embodiment of the present invention.

FIG. 6 is an enlarged perspective view illustrating that the portion of a battery cell to be bonded is washed using a laser according to a preferred embodiment of the present invention.

FIG. 7 is an enlarged perspective view illustrating that the battery cell according to the preferred embodiment of the present invention and a busbar are bonded to each other via a wire.

FIG. 8 is a flowchart showing a battery module assembly method according to a preferred embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module assembly apparatus using vision according to the present invention and an assembly method using the same will be described with reference to the accompanying drawings.

FIG. 2 is a perspective view showing a battery module according to a preferred embodiment of the present invention, and FIG. 3 is a sectional view of a cylindrical battery cell according to a preferred embodiment of the present invention.

Referring to FIGS. 2 and 3, the battery module 100 according to the present invention includes a module case 110, a cylindrical battery cell 120, a busbar 130, and a cover case 140.

The module case 110, which has a hexahedral outer shape, is provided with a space configured to receive the cylindrical battery cell 120, and a plurality of openings (not shown), through which terminals of the cylindrical battery cell 120 are exposed to the outside in a state in which the cylindrical battery cell is upright, is formed in the upper end of the module case 110.

Meanwhile, as shown in FIG. 3, a battery cell received in the battery module according to the present invention is a cylindrical battery cell 120, which may be manufactured by receiving an electrode assembly 121 having a wound type structure in a metal can 122, injecting an electrolytic solution into the metal can 122, and coupling a cap assembly 123 having an electrode terminal formed thereon to the open upper end of the metal can 122.

Here, the electrode assembly 121 is manufactured by sequentially stacking a positive electrode 121(*a*), a negative electrode 121(*b*), and a separator 121(*c*) and winding the same in a round shape.

A cylindrical center pin 125 is inserted into a hollow core portion 124 formed in a central region of the electrode assembly 121. The center pin 125 is generally made of a metal material in order to provide predetermined strength. The center pin 125 serves to fix and support the electrode assembly 121, and serves as a path configured to discharge gas generated due to internal reaction when the battery cell is charged and discharged and is operated.

Meanwhile, a positive electrode terminal 123(*a*) is formed so as to have a protruding shape at a middle region of the upper end of the cap assembly 123, and the remaining region of the cap assembly 123 constitutes a negative electrode terminal 123(*b*).

Of course, the cylindrical battery cell 120 is not particularly restricted as long as the positive electrode terminal 123(*a*) and the negative electrode terminal 123(*b*) are exposed or protrude from the upper end of the cap assembly 123.

The busbar 130, which is configured to connect a plurality of cylindrical battery cells 120 to each other in series or in parallel, is located in parallel to the cylindrical battery cells 120 in a state of being spaced apart therefrom by a predetermined distance.

The cover case 140, which is configured to protect the upper part of the cylindrical battery cell 120 received in the module case 110, is provided with an opening 142 configured to expose the upper surface of the cylindrical battery cell 120. In addition, the cover case is provided with a plurality of protrusions 141 protruding by a predetermined height in order to protect the cylindrical battery cell 120 from external impact applied from above.

FIG. 4 is an overall perspective view of a battery module assembly apparatus having vision according to a preferred embodiment of the present invention, and FIG. 5 is an enlarged perspective view showing the interior of the battery module assembly apparatus having vision according to the preferred embodiment of the present invention.

Referring to FIGS. 4 and 5, the battery module assembly apparatus according to the present invention includes a transfer unit 200, a vision unit 300, a washing unit 400, and a bonding unit 500.

The transfer unit 200 is configured to move a battery module 100 in a state in which a cylindrical battery cell 120 to be bonded is received therein forwards and rearwards (an X-axis direction). Specifically, the transfer unit 200 includes a seating die 210 having a flat structure configured to support the battery module 100 in a state of being in tight contact with the bottom surface of the battery module 100 and a rail 220 configured to provide a movement path of the seating die 210.

Here, it is preferable for a plurality guide portions 211 each having a predetermined height to be provided at corners of the seating die 210, and it is more preferable for an "L"-shaped marker 211' to be formed at the upper surface of each guide portion 211, which will be described below.

The vision unit 300 is configured to scan the upper surface of the battery module 100 transferred in a state of being seated on the seating die 210 in order to determine whether the module case 110 is seated at a predetermined position, and is configured to scan the position of the cylindrical battery cell 120 received in the module case 110 and to transmit the result to the washing unit 400 and the bonding unit 500.

The vision unit 300 configured to perform the above functions includes a first vision unit 310 and a second vision unit 320. Specifically, the first vision unit 310 is located ahead of the second vision unit, i.e. a position at which the battery module 100 is primarily scanned after the battery module is seated on the seating die 210 by a worker or a separate seating means (not shown), and includes a first vision camera 311 and a first illumination portion 312.

Here, a pair of first illumination portions 312 may be provided in a state of being spaced apart from each other by a predetermined distance. The first vision camera 311 is located above the pair of first illumination portions 312 to scan the upper surface of the battery module 100 that is moved.

That is, the first vision camera 311 scans the extent of twisting of the position at which the module case 110 is located and the position of the battery cell 120 received in the module case 110 based on the marker 211' of the guide portion 211.

The second vision unit 320 is located behind the first vision unit 310, and includes a second vision camera 321 and a second illumination portion 322. The second vision camera 321 and the second illumination portion 322 are identical in construction and function to the first vision camera 311 and the first illumination portion 312, respectively.

Here, the reason that the vision unit is constituted by the first vision unit 310 and the second vision unit 320, which perform the same function while forming a pair is that it is necessary to improve accuracy in bonding and to minimize a defect rate.

That is, in the present invention, the module case 110 having the cylindrical battery cell 120 received therein is moved along the rail 220 in order to minimize the movement distance of the washing unit 400 and the bonding unit 500, accurate movement of which is required, and therefore it is necessary to compare the result of the first vision unit 310 and the result of the second vision unit 320 with each other in order to determine again whether the module case is twisted during movement thereof.

FIG. 6 is an enlarged perspective view illustrating that the portion of the battery cell to be bonded is washed using a laser according to a preferred embodiment of the present invention.

In a process in which the cylindrical battery cell 120 is received in the module case 110 or in a process in which the cylindrical battery cell 120 is moved in a state of being received in the module case 110, various foreign matter, such as dust or oil and fat, may be attached to the surface of the electrode, which may lead to poor welding.

In the present invention, the washing unit 400 is provided to minimize the number of battery modules discarded due to poor welding. Specifically, the washing unit 400 is provided at the lower end of a body thereof with a tip portion 410, and a laser is applied through the tip portion 410 in order to wash the upper surface of the cylindrical battery cell 120.

In particular, it is possible to wash only a region to be welded using a laser based on scanning results obtained by the first vision unit 310 and the second vision unit 320, whereby it is possible to rapidly assemble the battery module while reducing energy consumption.

Meanwhile, the washing unit 400 may be located in the order of the first vision unit 310, the washing unit 400, and the second vision unit 320, or may be located in the order of the first vision unit 310, the second vision unit 320 and the washing unit 400.

FIG. 7 is an enlarged perspective view illustrating that the battery cell according to the preferred embodiment of the present invention and the busbar are bonded to each other via a wire.

The bonding unit 500, which electrically connects the positive electrode of the battery cell and the busbar to each other and electrically connects the negative electrode of the battery cell and the busbar to each other, is provided at the lower end thereof with a pointed nozzle portion 510, and a molten conductive metal is discharged through the nozzle portion 510.

That is, the bonding unit 500 is movable in an upward-downward direction, a leftward-rightward direction, and a forward-rearward direction, and performs bonding between the positive electrode of the battery cell 120 and the busbar and between the negative electrode of the battery cell and the busbar in the form of a wire W while repeatedly moving based on scanning results obtained by the first vision unit 310 and the second vision unit 320.

FIG. 8 is a flowchart showing a battery module assembly method according to a preferred embodiment of the present invention.

The assembly method using the battery module assembly apparatus using vision according to the present invention includes a first step of seating a battery module having a cylindrical battery cell 120 received therein on the transfer unit 200; a second step of moving the transfer unit 200; a third step of checking the position of the battery module 100 through the vision unit located on the movement path of the transfer unit 200; and a fourth step of bonding an electrode of the cylindrical battery cell 120 received in the battery module 100 and a busbar 210 to each other.

Meanwhile, it is preferable to check the position of the battery module 100 twice in the third step, and it is more preferable to further perform a washing step before the fourth step.

That is, in the third step, the first vision unit 310, the washing unit 400, and the second vision unit 320 may be sequentially located, and therefore primary checking of the position of the battery module 100, washing, and secondary checking of the position of the battery module 100 may be sequentially performed. In this case, the position of the battery module 100 can be checked before bonding even though the battery module 100 is somewhat misaligned during washing, whereby it is possible to accurately recognize a bonding position.

Also, in the third step, the first vision unit 310, the second vision unit 320, and the washing unit 400 may be sequentially located, and therefore primary checking of the position of the battery module 100, secondary checking of the position of the battery module 100, and washing may be sequentially performed. In this case, bonding may be performed immediately after washing, whereby a possibility of foreign matter attachment is reduced, and therefore it is possible to minimize bonding defects due to foreign matter.

One or more battery modules, each of which is assembled using the assembly method using vision according to the present invention, may be connected to each other in order to constitute a battery pack.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

100: Battery module
110: Module case
120: Cylindrical battery cell
121: Electrode assembly
121(*a*): Positive electrode 121(*b*): Negative electrode
121(*c*): Separator
122: Metal can
123: Cap assembly
123(*a*): Positive electrode terminal 123(*b*): Negative electrode terminal
124: Core portion
125: Center pin
130: Busbar
140: Cover case
141: Protrusion 142: Opening
200: Transfer unit
210: Seating die
211: Guide portion 211': Marker
220: Rail
300: Vision unit
310: First vision unit
311: First vision camera 312: First illumination portion
320: Second vision unit
321: Second vision camera 322: Second illumination portion
400: Washing unit
410: Tip portion
500: Bonding unit
510: Nozzle portion
W: Wire

The invention claimed is:

1. A battery module assembly apparatus using vision, the battery module assembly apparatus comprising:
   a transfer unit configured to move in at least one of forwards, rearwards, leftwards and rightwards when a battery module having a battery cell received therein is seated on the transfer unit;
   a vision unit overlapping the transfer unit and configured to check a position of the battery module; and
   a bonding unit located adjacent to the vision unit and configured to electrically connect an electrode of the battery cell and a busbar to each other,
   wherein the transfer unit comprises:
   a seating die configured to allow a bottom surface of the battery module to be disposed in contact therewith;
   a plurality of guide portions located at corners of the seating die at a periphery of the battery module, each of the plurality of guide portions having a predetermined height; and
   a marker formed at an upper surface of each of the plurality of guide portions.

2. The battery module assembly apparatus according to claim 1, wherein the battery module disposed on the seating die further has a cover case configured to cover an upper part of the received battery cell.

3. The battery module assembly apparatus according to claim 2, wherein the cover case is provided with a protrusion formed so as to protrude upwards by a predetermined height and an opening configured to allow a portion of an upper surface of the battery cell to be exposed therethrough.

4. The battery module assembly apparatus according to claim 1, wherein the marker is formed in an "L-shape".

5. The battery module assembly apparatus according to claim 1, wherein the vision unit comprises an illumination portion and a vision camera configured to scan the battery module that are located adjacent to each other.

6. The battery module assembly apparatus according of claim 5, wherein, among the illumination portion and the vision camera of the vision unit and, the illumination portion is located closer to the seating die than the vision camera when the vision unit overlaps the transfer unit.

7. The battery module assembly apparatus according to claim 1, further comprising a washing unit overlapping the transfer unit and configured to remove foreign matter from the battery cell.

8. The battery module assembly apparatus according to claim 7, wherein the washing unit is a laser device.

9. The battery module assembly apparatus according to claim 7, wherein the vision unit comprises a first vision unit and a second vision unit, and
    wherein the first vision unit, the washing unit, and the second vision unit are sequentially located in order along a movement path of the seating die.

10. The battery module assembly apparatus according to claim 7, wherein the vision unit comprises a first vision unit and a second vision unit, and
    wherein the first vision unit, the second vision unit, and the washing unit are sequentially located in order along a movement path of the seating die.

11. The battery module assembly apparatus according of claim 1, wherein the predetermined height matches a height of the battery module disposed on the seating die.

\* \* \* \* \*